No. 670,652. Patented Mar. 26, 1901.
H. F. WALLACE.
EYEGLASSES.
(Application filed Apr. 19, 1900.)
(No Model.)
FIG. I.
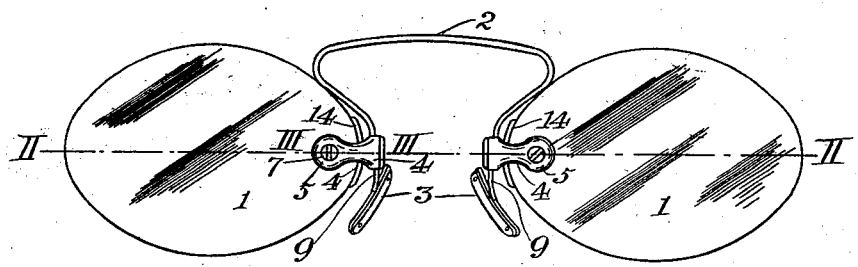
FIG. II.
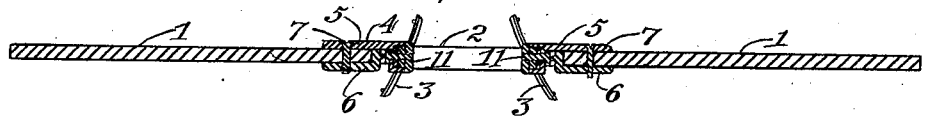
FIG. III.
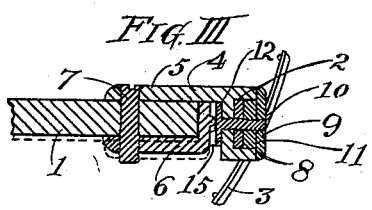
FIG. IV.
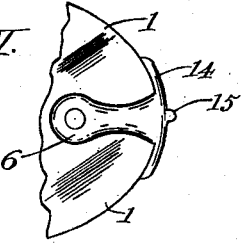
FIG. V.
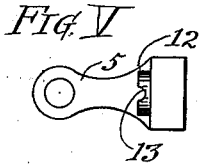
FIG. VII.
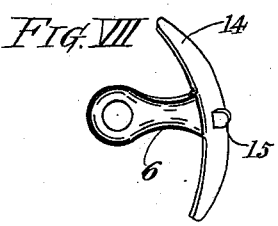
FIG. VI.
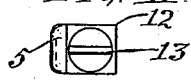
Witnesses:
Robt. Train
Olin G. McWain
Inventor.
H. F. Wallace.
by Knight Bros.
Attorneys.
THE NORRIS PETERS CO., PHOTO-LITHO., WASHINGTON, D. C.

UNITED STATES PATENT OFFICE.

HOWARD F. WALLACE, OF LOS ANGELES, CALIFORNIA.

EYEGLASSES.

SPECIFICATION forming part of Letters Patent No. 670,652, dated March 26, 1901.

Application filed April 19, 1900. Serial No. 13,524. (No model.)

*To all whom it may concern:*

Be it known that I, HOWARD F. WALLACE, a citizen of the United States, with residence and post-office address at 1116 Georgia street, city of Los Angeles, in the county of Los Angeles and State of California, have invented certain new and useful Improvements in Eyeglasses, of which the following is a full, clear, and exact description, reference being had to the accompanying drawings, which form a part of this specification.

My invention relates to certain new and useful improvements in eyeglasses and which may also be used in spectacles; and my invention consists in certain features of novelty hereinafter described and claimed.

Figure I is a front elevation of a pair of eyeglasses with my improved attachment. Fig. II is a longitudinal section taken on line II II, Fig. I. Fig. III is a section, on an enlarged scale, taken on line III III, Fig. I. Fig. IV is an enlarged detail view of one wing of the clamp. Fig. V is a side elevation of the opposite wing of the clamp. Fig. VI is an end view of Fig. V, showing groove for the adjustable clamp. Fig. VII is an enlarged perspective view of the movable wing of the clamp.

Referring to the drawings, 1 represents the lenses, 2 the eyeglass-spring, and 3 the nose-guard.

4 represents the clamp as a whole for securing the spring and guard to the lens. This clamp has commonly been made solid, so as to take in but one thickness of lens, while in my improvement I provide a fixed wing 5 of the clamp and a movable wing 6, connected by a screw 7, which permits of securing any thickness of lens desirable to the clamp. (See Fig. III.) The wing 5 is provided with a socket 8, in which rest the eyeglass-spring 2 and the spring 9 of the nose-guard 3, said springs being secured in the socket by means of a screw-threaded stud 10, passing through the wing 5 of the clamp, through said springs, and having a nut 11 secured to its outer end. The opposite end of the stud 10 is provided with a head 12, having a groove 13 therein. The movable wing 6 of the clamp is provided at its inner end with a bearing-bracket 14, which bears against the inner edge of the lens and prevents the same from moving on the screw 7. I provide a lug 15 on the outer face of the bracket 14, said lug registering with and sliding in the groove 13 as the clamp is adjusted to the eyeglasses, the screw 7 being adjusted at the same time at the opposite end of the clamp.

By the use of the means described I provide a simple and efficient device for taking in any thickness of lens or glass without having to use separate clamps for each thickness of lens. It will be obvious that this same improvement may be used in connection with spectacles without departing from the spirit of my invention.

I claim as my invention—

1. A lens-clamp for eyeglasses comprising a movable wing having a bearing-bracket adapted to bear against the edge of a lens, a lug on the outer face of said bracket, a second wing having a screw-threaded socket, a screw-threaded stud having a nut-head provided with a groove adapted to engage the lug on the movable wing and means to secure the parts together.

2. In an eyeglass, the combination of a lens, a clamp having a fixed member and a movable member, a socket in the fixed member for holding the eyeglass-spring and nose-guard spring, a screw-threaded stud passing through the fixed member and the springs, and having a nut secured to its inner end, a head on the opposite end of the stud having a groove therein, a lug on the movable member adapted to slide in said groove, and a screw for holding the separate members of the clamp in their connection with the lens, substantially as set forth.

HOWARD F. WALLACE.

Witnesses:
EMMET H. WILSON,
JAS. E. KNIGHT.